United States Patent
Percy et al.

(10) Patent No.: US 11,587,287 B2
(45) Date of Patent: Feb. 21, 2023

(54) METHOD OF FORMING A PHYSICAL MODEL OF A GEOGRAPHIC AREA

(71) Applicant: Thomas Percy, Burleigh Heads (AU)

(72) Inventors: Thomas Percy, Burleigh Heads (AU); Kristian Weegink, Burleigh Heads (AU)

(73) Assignee: Thomas Percy, Burleigh Heads (AU)

( * ) Notice: Subject to any disclaimer, the term of this patent is extended or adjusted under 35 U.S.C. 154(b) by 179 days.

(21) Appl. No.: 17/092,649

(22) Filed: Nov. 9, 2020

(65) Prior Publication Data

US 2021/0142560 A1 May 13, 2021

(30) Foreign Application Priority Data

Nov. 8, 2019 (AU) .................. 2019904217

(51) Int. Cl.
  G06T 17/05 (2011.01)
  G06T 19/20 (2011.01)
(52) U.S. Cl.
  CPC .............. G06T 17/05 (2013.01); G06T 19/20 (2013.01)
(58) Field of Classification Search
  CPC .................. G06T 17/05; G06T 19/20
  See application file for complete search history.

(56) References Cited

U.S. PATENT DOCUMENTS

| | | | | |
|---|---|---|---|---|
| 5,229,698 A | * | 7/1993 | Minnich | G05B 19/4103 |
| | | | | 318/568.15 |
| 10,679,521 B1 | * | 6/2020 | Hunn | B33Y 50/00 |
| 2007/0013724 A1 | * | 1/2007 | Swift | G06F 30/00 |
| | | | | 345/660 |
| 2007/0042327 A1 | * | 2/2007 | Swift | G09B 25/06 |
| | | | | 434/72 |
| 2008/0015947 A1 | * | 1/2008 | Swift | G06Q 30/0601 |
| | | | | 705/26.1 |
| 2011/0306022 A1 | * | 12/2011 | Wcislo | G09B 29/00 |
| | | | | 434/150 |

(Continued)

FOREIGN PATENT DOCUMENTS

| | | | | |
|---|---|---|---|---|
| EP | 1927954 A1 | * | 6/2008 | G06T 17/05 |
| WO | WO-2018029694 A1 | * | 2/2018 | B29C 64/386 |

OTHER PUBLICATIONS

Aitcheson, Robert, Jonathan Friedman, and Thomas Seebohm. "3-Axis CNC milling in architectural design." International Journal of Architectural Computing 3.2 (2005): 161-180. (Year: 2005).*

(Continued)

*Primary Examiner* — King Y Poon
*Assistant Examiner* — Vincent Peren
(74) *Attorney, Agent, or Firm* — von Briesen & Roper, s.c.

(57) ABSTRACT

A method of forming a physical model of a geographic area. The method includes the steps of generating a digital elevation model of a topography of a defined geographic area, scaling the digital elevation model to a predetermined size, determining a parametric function from the scaled digital elevation model according to a predetermined shape, determining a linear function from the parametric function, determining a machine path from the linear function, and forming one or more material portions according to the machine path, thereby forming one or more portions representative of the defined geographic area.

20 Claims, 5 Drawing Sheets

(56) References Cited

U.S. PATENT DOCUMENTS

2013/0297064 A1* 11/2013 Sherbrooke ............... B23C 3/16
                                                    409/80
2015/0248577 A1*  9/2015 Goodwin ................ G01S 17/89
                                                    382/103
2019/0125044 A1*  5/2019 Reckord ................ A44C 15/00

OTHER PUBLICATIONS

Hasiuk, Franciszek J., et al. "TouchTerrain: A simple web-tool for creating 3D-printable topographic models." Computers & Geosciences 109 (2017): 25-31. (Year: 2017).*

Petrasova, Anna, et al. Tangible modeling with open source GIS. New York, New York, USA: Springer International Publishing, 2018. (Year: 2018).*

* cited by examiner

METHOD OF FORMING A PHYSICAL MODEL OF A GEOGRAPHIC AREA

CROSS-REFERENCE TO RELATED APPLICATION

This patent application claims priority under the Paris Convention to the Australian Patent Application No, 2019904217 filed on Nov. 8, 2019, the entire content of which is incorporated herein by reference.

FIELD

The present disclosure relates to a method of forming a physical model of a geographic area. More specifically, the present disclosure relates to a method of forming a physical model of a geographic area from a digital elevation model.

BACKGROUND

Any references to methods, apparatus or documents of the prior are not to be taken as constituting any evidence or admission that they formed, or form, part of the common general knowledge.

Maps, paintings and photographs of geographic locations are a popular fixture in homes and offices. However, these 2D images can often fail to capture the unique beauty and topography of the locations they attempt to depict.

Thus, there is a need for an improved way to depict geographic locations and areas.

SUMMARY OF THE INVENTION

In one form, there is provided a method of forming a physical model of a geographic area from a digital elevation model. Preferably, the physical model is formed according to a geometric shape, such as a spiral, concentric circles, or series of substantially parallel surfaces, for example. Preferably, the physical model is formed according to a topography of the geographic area.

In another form, there is provided a method of forming a physical model of a geographic area, the method comprising the steps of:
  generating a digital elevation model of a topography of a defined geographic area;
  scaling the digital elevation model to a predetermined size;
  determining a parametric function from the scaled digital elevation model according to a predetermined shape;
  determining a linear function from the parametric function;
  determining a cutting path from the linear function;
  cutting one or more material portions according to the cutting path, thereby forming one or more cutouts.

Preferably, the one or more cutouts are representative of the defined geographic area.

Preferably, the method further comprises the step of applying the one or more cutouts to a base portion adapted to retain the one or more cutouts in accordance with the predetermined shape to thereby produce a physical model of the geographic area.

Preferably, the geographic area comprises a landscape or waterscape.

In another form, there is provided a method of determining a digital model of a geographical area, the method comprising:
  generating a digital elevation model of a topography of a defined geographic area;
  scaling the digital elevation model to a predetermined size;
  determining a parametric function sampling elevation based on a predetermined shape;
  transforming the parametric function into a linear function; and
  interpolating the linear function to determine a linear path for a cutting path.

In yet another form, there is provided a method of operating one or more electronic processors to calculate a digital model of a geographical area, the method comprising:
  generating a digital elevation model of a topography of a defined geographic area;
  scaling the digital elevation model to a predetermined size;
  determining a parametric function from the scaled digital elevation model according to a predetermined shape;
  determining a linear function from the parametric function; an
  determining a cutting path from the linear function.

Preferably, the method further comprises operating a cutting tool, wherein the cutting tool receives the cutting path from the one or more electronic processors and the cutting tool cuts a material according to the cutting path.

In yet another form, there is provided a software program configured to calculate a digital model of a geographic area, wherein the software program is operable to:
  generate a digital elevation model of a topography of a defined geographic area;
  scale the digital elevation model to a predetermined size;
  determine a parametric function from the scaled digital elevation model according to a predetermined shape;
  determine a linear function from the parametric function and
  determine a cutting path from the linear function.

In another form, there is provided a software program configured to calculate a digital model of a geographic area, wherein the software program is operable to:
  generate a digital elevation model of a topography of a defined geographic area;
  scale the digital elevation model to a predetermined size;
  determine a parametric function from the scaled digital elevation model according to a predetermined shape;
  determine a linear function from the parametric function; and
  determine a machine path from the linear function.

Preferably, the machine path defines a cutting path or a printing path for a manufacturing tool to form one or more portions from a material based on the machine path.

In an embodiment, the method receives the digital elevation model as an input file that is uploaded to the software program from a database or memory of a computer having the software programmed installed thereon.

In another form, there is provided a system for forming a physical model of a geographic area, the system comprising:
  a computer having one or more electronics and a software product installed thereon, the software product being configured to operate the one or more electronic processors of the computer to calculate a digital model of a geographic area from geospatial data by:
    generating a digital elevation model of a topography of a defined geographic area from geospatial data;
    scaling the digital elevation model to a predetermined size;

determining a parametric function from the scaled digital elevation model according to a predetermined shape;
determining a linear function from the parametric function; and
determining a cutting path from the linear function; and
a cutting tool configured to receive the cutting path from the computer and cut one or more lengths of material according to the cutting path to produce one or more cutouts.

In another form, there is provided a method of forming a physical model of a geographic area, the method comprising the steps of:
generating a digital elevation model of a topography of a defined geographic area;
scaling the digital elevation model to a predetermined size;
determining a parametric function from the scaled digital elevation model according to a predetermined shape;
determining a linear function from the parametric function;
determining a printing path from the linear function;
printing one or more material portions according to the printing path, wherein the one or more material portions are representative of the defined geographic area.

In another form, there is provided a system for forming a physical model of a geographic area, the system comprising:
a computer having one or more electronics and a software product installed thereon, the software product being configured to operate the one or more electronic processors of the computer to calculate a digital model of a geographic area from geospatial data by:
generating a digital elevation model of a topography of a defined geographic area from geospatial data;
scaling the digital elevation model to a predetermined size;
determining a parametric function from the scaled digital elevation model according to a predetermined shape;
determining a linear function from the parametric function; and
determining a printing path from the linear function; and
an additive manufacturing tool configured to receive the printing path from the computer and print one or more lengths of material according to the printing path to produce one or more portions representative of the geographic area In yet another form, there is provided a method of forming a physical model of a geographic area, the method comprising the steps of:
generating a digital elevation model of a topography of a defined geographic area;
scaling the digital elevation model to a predetermined size;
determining a parametric function from the scaled digital elevation model according to a predetermined shape;
determining a linear function from the parametric function; and
forming one or more portions based on the linear function, wherein the one or more portions are representative of the defined geographic area.

In another form, there is provided a system for forming a physical model of a geographic area, the system comprising:
a computer having one or more electronics and a software product installed thereon, the software product being configured to operate the one or more electronic processors of the computer to calculate a digital model of a geographic area from geospatial data by:
generating a digital elevation model of a topography of a defined geographic area from geospatial data;
scaling the digital elevation model to a predetermined size;
determining a parametric function from the scaled digital elevation model according to a predetermined shape; and
determining a linear function from the parametric function; and
a manufacturing tool configured to form one or more portions representative of the geographic area based on the linear function.

Preferably, the method further comprises the step of determining a machine path from the linear function. Preferably, the method further comprises the step of forming the one or more portions from the machine path.

Preferably, the software product is further configured to determine a machine path from the linear function, and wherein the manufacturing is configured to receive the machine path and produce one or more portions representative of the geographic area based on the machine path.

In one form, there is provided a physical model of an area formed from a digital elevation model according to a predetermined shape.

In another form, there is provided a method of forming a physical model of a geographic area, the method comprising the steps of:
generating a digital elevation model of a topography of a defined geographic area;
scaling the digital elevation model to a predetermined size;
determining a parametric function from the scaled digital elevation model according to a predetermined shape;
determining a linear function from the parametric function;
determining a machine path from the linear function; and
forming one or more material portions according to the machine path, thereby forming one or more portions representative of the defined geographic area.

In another form, there is provided a system for forming a physical model of a geographic area, the system comprising:
a computer having one or more electronics and a software product installed thereon, the software product being configured to operate the one or more electronic processors of the computer to calculate a digital model of a geographic area from geospatial data by:
generating a digital elevation model of a topography of a defined geographic area from geospatial data;
scaling the digital elevation model to a predetermined size;
determining a parametric function from the scaled digital elevation model according to a predetermined shape; and
determining a linear function from the parametric function;
determining a machine path from the linear function; and
a manufacturing tool configured to receive the machine path from the computer and print one or more lengths of material according to the machine path to produce one or more portions representative of the geographic area.

BRIEF DESCRIPTION OF THE DRAWINGS

Embodiments in accordance with the present disclosure will be described, by way of example, in the following Detailed Description of Preferred Embodiments, which provides sufficient information for those skilled in the art to perform the invention. The Detailed Description of Preferred Embodiments is not to be regarded as limiting the scope of the preceding Summary section in any way. The Detailed Description will make reference to the accompanying drawings, by way of example, in which:

FIG. 3 illustrates examples of the shapes that the physical model may be formed from;

DETAILED DESCRIPTION OF THE PREFERRED EMBODIMENTS

The present disclosure relates to a method of forming a physical model of a geographic area (such as a landscape or waterscape) from a digital elevation model. Generally, the disclosure provides a method of forming a physical model of a geographic area by converting the 3D data associated with the geographic area into a 2D line that can be used to cut one or more pieces of material into a shape that approximates the geographic area.

Figure 3:
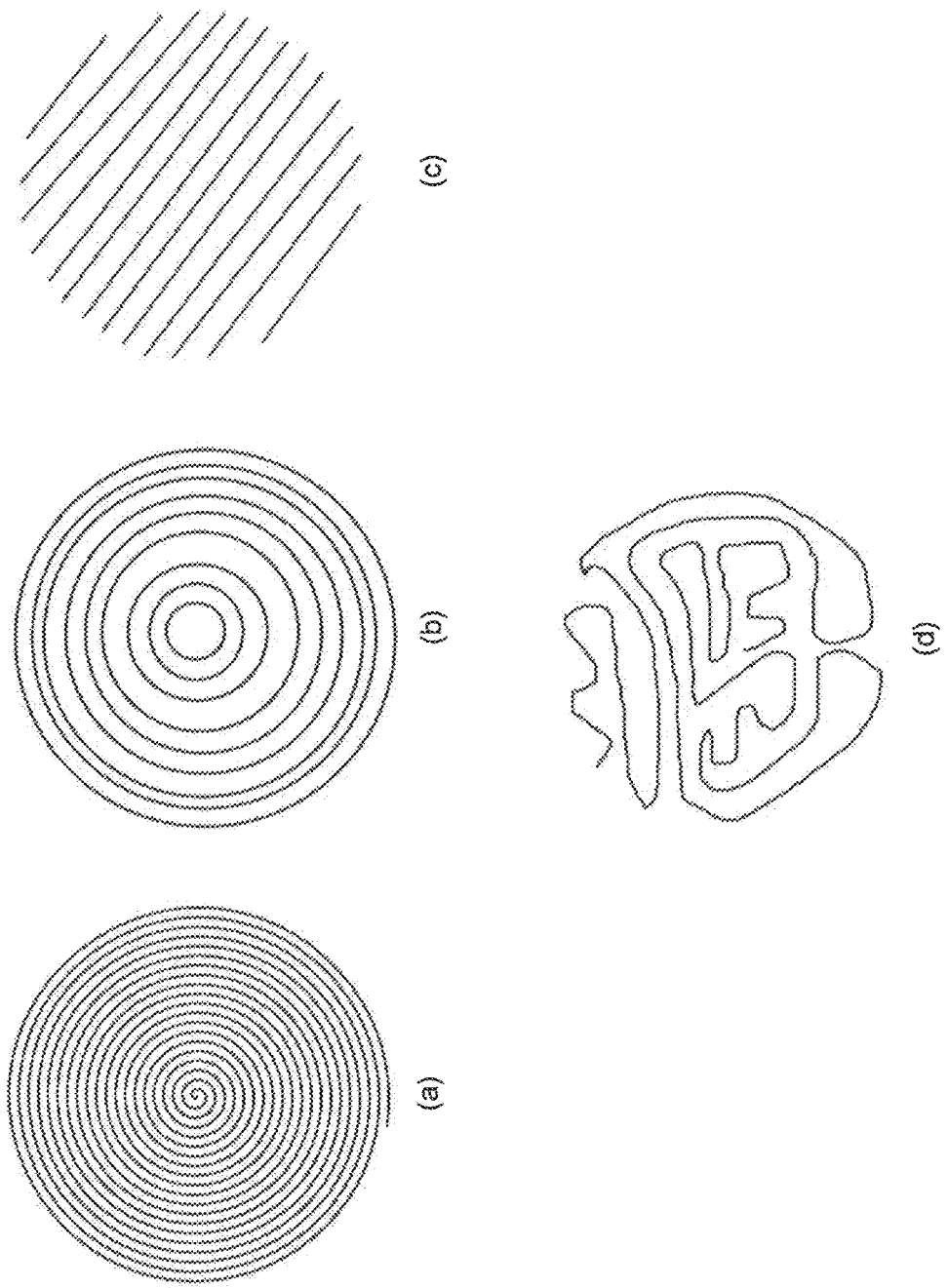

As will become clear from the following description, the physical model can be formed from a single piece of material that is cut according to a specific shape and then rolled to show a model of the geographic area or may be formed from a number of concentric circles, a number of substantially parallel strips of material, a z-curve, a Hilbert curve or a random/organic shape or line. Examples of these shapes are shown in FIG. 3 including a spiral (3(a)), concentric circles (3(b)), a series of substantially parallel surfaces (3(c)) and a random shape (3(d)).

Exemplary embodiments of the invention include a method for forming a physical model of a geographic area. The method includes generating a digital elevation model of a topography of a defined geographic area, such as a mountain or lake that a customer wishes to have represented in a physical model.

Once the digital elevation model has been generated, the digital elevation model is scaled to a predetermined size.

In a next step, a parametric function is determined from the scaled digital elevation model according to a predetermined shape.

Subsequently, a linear function is derived from the parametric function and a machine path is determined. The machine path defines the path for a manufacturing tool or machine to follow to form one or more portions that can be manipulated and/or used to construct the physical model that represents the defined geographic area.

The machine path is then provided to a machine or manufacturing tool, such as a subtractive manufacturing tool (e.g. a cutting tool) or an additive manufacturing tool (e.g. a 3D printer) to operate the tool to form one or more portions which are representative of the defined geographic area.

The tool uses the machine path to guide the tool to either cut or additively produce the one or more portions.

Figure 1:
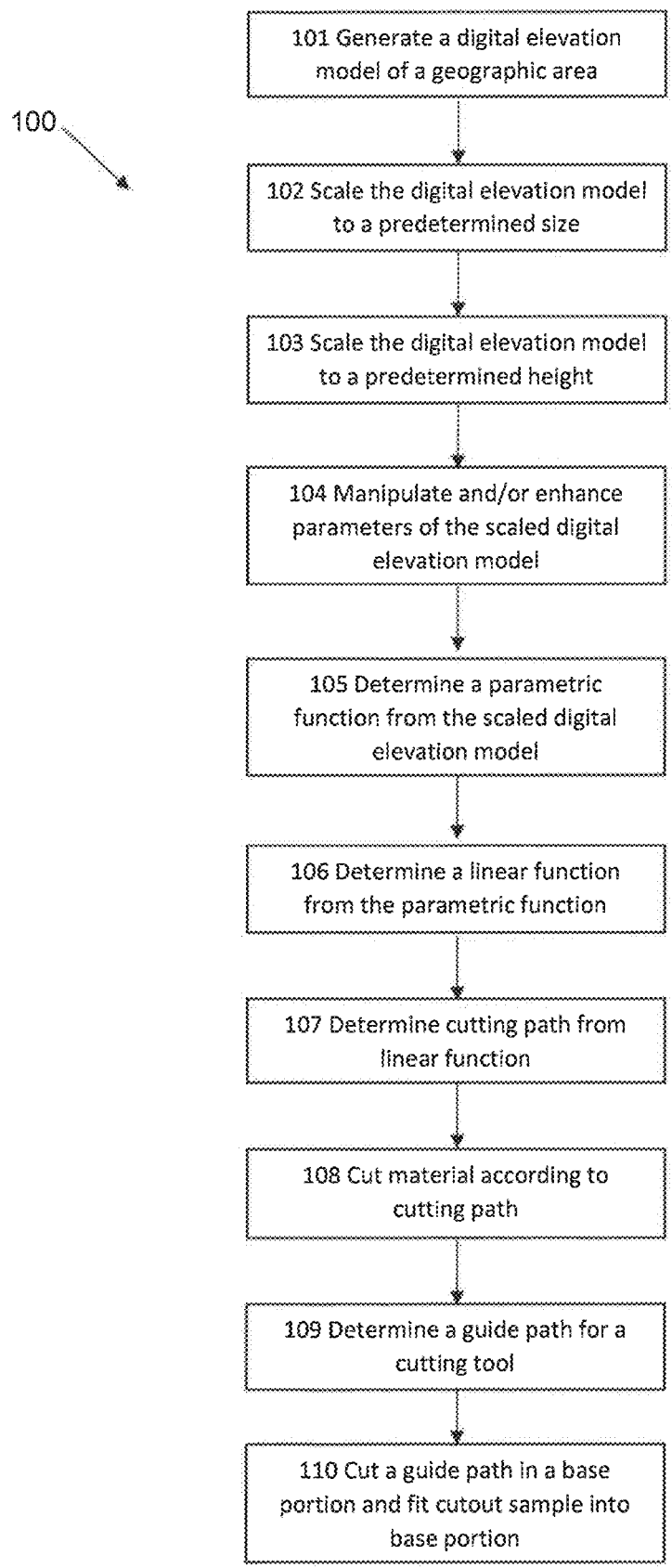
FIG. 1 illustrates a flowchart of steps of a method of forming a physical model of a geographic area in accordance with an embodiment of the invention.

Referring now to FIG. 1, there is illustrated a flowchart of an exemplary method 100 (that may be implemented in computer system 33 described below, for example) of calculating a digital model of a geographical area and forming a physical model from the digital model.

At Step 101, the method includes the step of generating a digital elevation model of the topography of a chosen geographic area (such as a waterscape or landscape, for example). The chosen geographic area may comprise a location that is familiar to a person desiring the physical model or may be a location that they find to be particularly interesting or beautiful.

In generating the digital elevation model, the digital elevation model of the topography of the geographic area is extracted from a geospatial database and includes a height (z) of the topography of the geographic area and geographic coordinates (x, y), where z=F(x, y).

In a next step, Step 102, the method scales the digital elevation model to a predetermined size (L) in the x- and y-planes. The digital elevation model is scaled in the range of [0,L]. The predetermined size may be any value as defined by a customer or designer.

In Step 103, the digital elevation model height (z) is scaled to a predetermined height (H) in the range of [0,H], where H is defined by the predetermined height of the physical model. The predetermined height of the physical model may also be any value as desired.

In Step 104, the x, y and z parameters can be manipulated and/or enhanced for illustrative purposes. For example, in some embodiments, an algorithm $z=F(x,y)^2$ or $z=e^{F(x,y)}$ can be used to accentuate peaks of the topography and/or $z=F(x, y) \times H(x, y)$ can be used to reduce the edge heights of the physical model to 0 smoothly or continuously, rather than discontinuously or suddenly, which may detract from the aesthetic of the physical model.

In Step 105, using an algorithm, a parametric function is determined from the scaled x, y and z parameters of the scaled digital elevation model. The parametric function samples the elevation along the path of a predetermined shape of the physical model. The predetermined shape, as described above, may include a spiral, a series of concentric circles, a plurality of substantially parallel surfaces or some other shape or configuration.

The parametric function of the scaled digital elevation model is parameterised as a function of t and is defined by x=f(t), y=g(t), where x and y are coordinates of the elevation model and t over the range [0,T] covers the area of the physical model.

In Step 106, a linear function is determined or derived from the parametric function calculated in Step 105.

More specifically, the functions are transformed into a linear path consisting of an equally spaced sequence of linear segments that represent the heights along the curve defined by the scaled digital elevation model. The distance for each linear segment between t=u and t=v by:

$$\int_u^v \sqrt{\left(\frac{dx}{dt}\right)^2 + \left(\frac{dy}{dt}\right)^2}\, dt.$$

In Step 107, the elevation at each sample point (determined above) is determined from the linear function to create a cutting path. In particular, a linear path that represents the heights of the elevation at each sample point along the curve is interpolated to produce a new curve to define a cutting path along a flat strip of material or piece of material that will form the finished physical model which represents and approximates the geographic area. The material can conceivably be any material that is capable of being cut, such as fabric, resins, thermoplastic, wood (preferably thin wood) leather, plastic, cardboard or rubber, to name a few examples.

Figure 4:
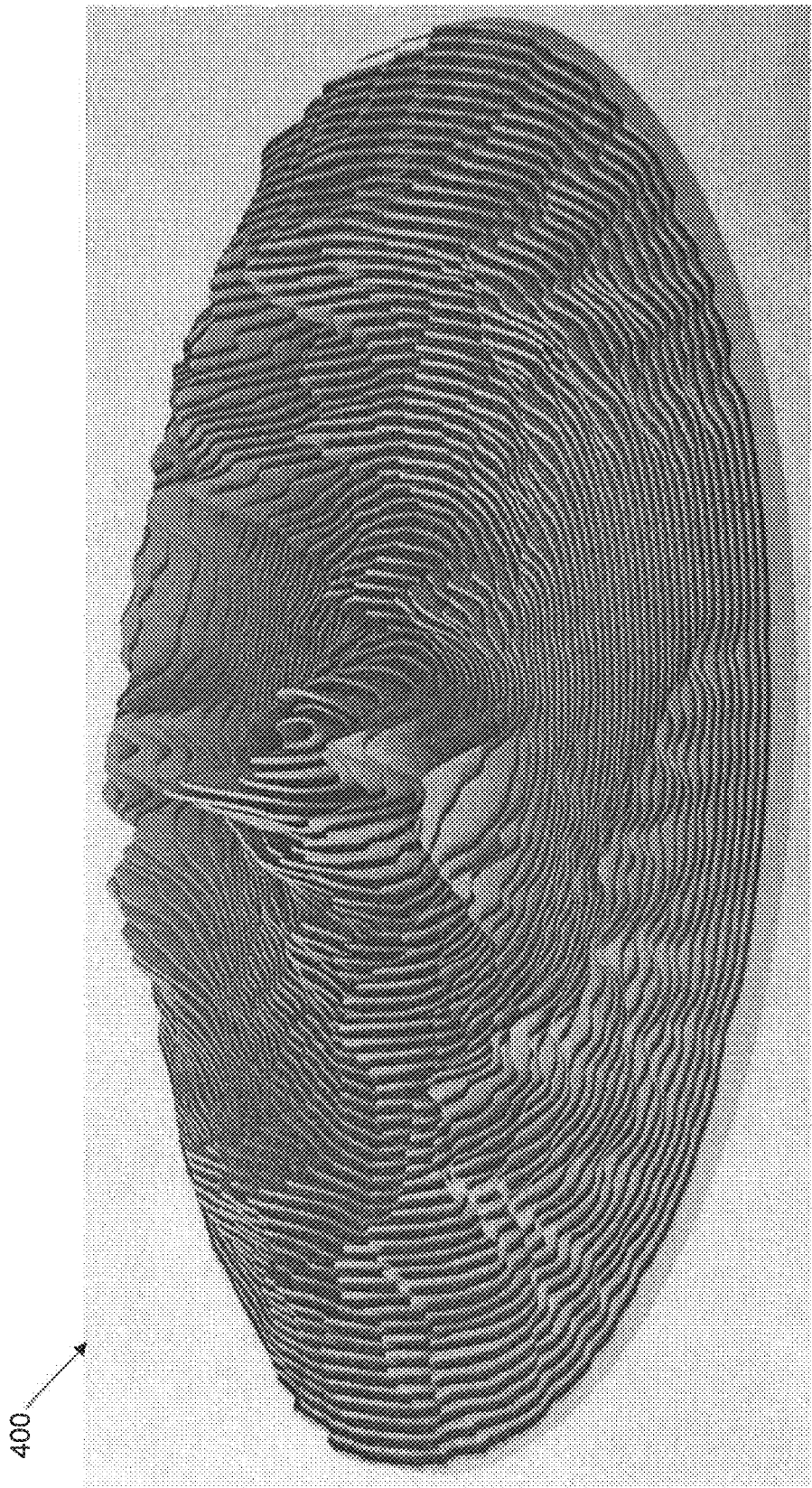
FIG. 4 illustrates a physical model of a geographic area formed in accordance with a method described herein.

In Step 108, the material is then cut according to the cutting path using an appropriate cutting tool (such as a laser cutter, for example) to produce a linear cutout sample. The linear cutout sample (i.e. the cut material) is then physically manipulated in accordance with the predetermined shape according to the parametric function. An example of a linear cutout sample 400 formed from a single length of material as a spiral that represents a geographic area is shown in FIG. 4.

In Step 109, a guide path is determined to ensure alignment of the manipulated material with the parametric function for the predetermined shape. The guide is determined by interpolating the values of the parametric function along x and y coordinates to produce a tool path that can be used with a cutting tool such as CNC router or a laser cutter, for example.

In Step 110, the cutting tool is then programmed with the tool path and physically cuts the guide path into a base portion that the linear cutout sample/s is inserted into or attached to hold the linear cutout sample/s in the appropriate positions to produce the physical model of the geographic area.

Figure 2:
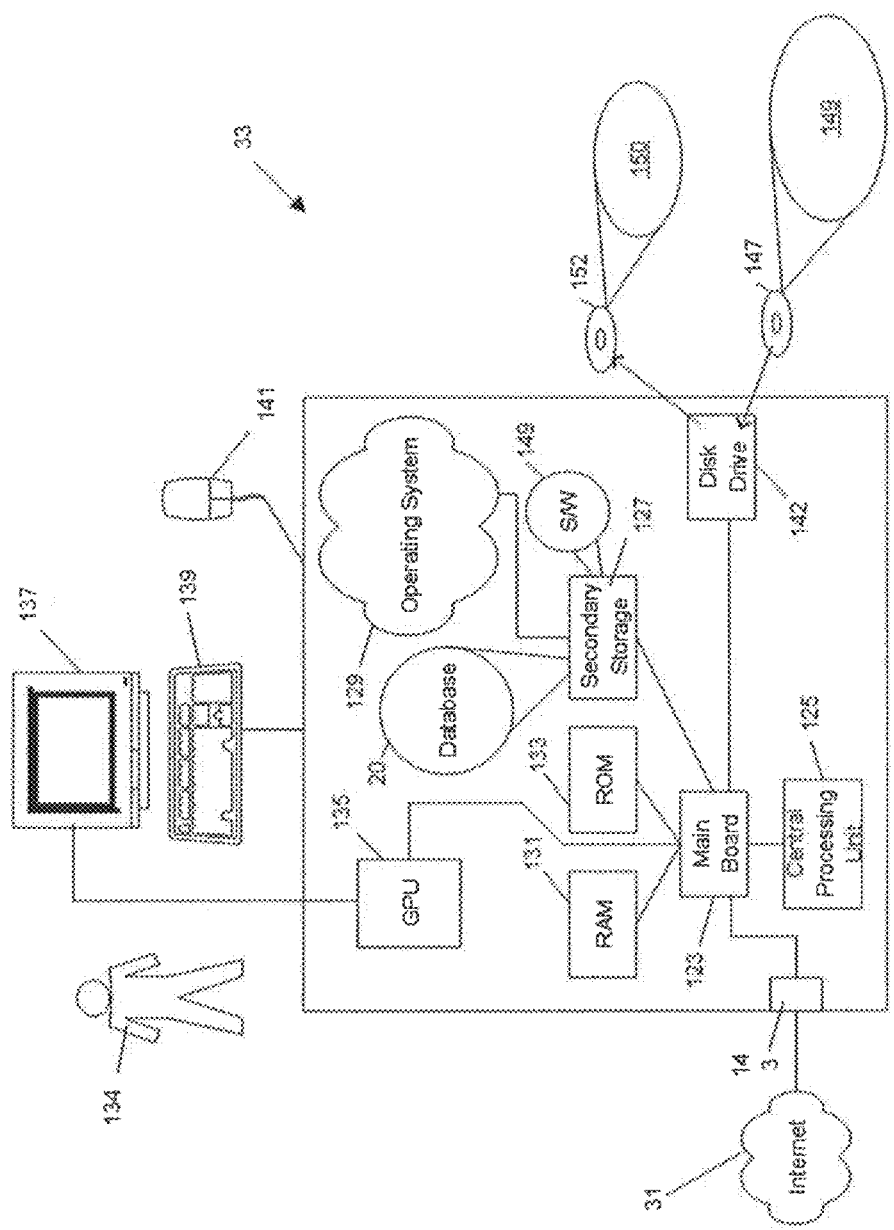
FIG. 2 is a block diagram of a computational apparatus in the form of a computer that is specially programmed to calculate a cutting path for a physical model of a geographic area.

Referring now to FIG. 2, there is shown a block diagram of an exemplary computer system 33 for carrying out a method, such as method 100 described above or method 500 described below, according to an embodiment of the invention that will be described.

The computer system 33 includes a main board 123 which includes circuitry for powering and interfacing to at least one on-board Central Processing Unit (CPU) 125. The one or more on-board processor(s) 125 may comprise two or more discrete processors or processor with multiple processing cores.

The main board 123 acts as an interface between CPU 125 and secondary memory storage 127. The secondary memory storage 127 may comprise one or more optical or magnetic, or solid state, drives. The secondary memory storage 127 stores instructions for an operating system 129.

The main board 123 includes busses by which the CPU is able to communicate with random access memory (RAM) 131, read only memory (ROM) 133 and various peripheral circuits. The ROM 133 typically stores instructions for a Basic Input Output System (BIOS) which the CPU 125 accesses upon start up and which prepares the CPU 125 for loading of the operating system 129.

The main board 123 also interfaces with a graphics processor unit (GPU) 135. It will be understood that in some systems the graphics processor unit 135 is integrated into the main board 123. The GPU 135 drives a display 137 which includes a rectangular screen comprising an array of pixels.

The main board 123 will typically include a communications adapter, for example a LAN adapter or a modem, either wired or wireless, that is able to put the computer system 33 in data communication with a computer network such as the Internet 31 via port 143.

A user 134 of the computer system 33 may interface with it by means of a keyboard 139, a mouse 141 and the display 137.

The computer system 33 automatically, via programming, commands the operating system 129 to load software product 149 which contains instructions for the computer system 33 to perform calculations to determine the cutting paths to form both the linear cutout sample/s and the guide path (described above) by operation of CPU 125 and, in some embodiments, GPU 135. The calculations performed by software product 149 in combination with the CPU 125 may be stored in memory (as discussed above) or output on the display 137 in a graphical manner for immediate (i.e. real-time) consideration by the user 134.

The calculations may then be transmitted to an external device, such as cutting tool, to cut one or more material portions according to the cutting paths calculated above to thereby produce one or more cutouts that approximate the topography of the geographic area to be depicted.

The predetermined shape, size and height of the physical model may be input by one of the interface mechanisms of the computer system 33 such as the keyboard 139, mouse 141 and display 137. The software product 149 may be provided as tangible instructions borne upon a computer readable media such as an optical disk 147 for reading by a disk reader/writer 142. Alternatively, the software product 149 might also be downloaded via port 143 from a remote data source via data network 145.

Software product 149 may also include instructions to read geospatial data associated with a digital elevation model of a geographic area from secondary memory storage 127 or to retrieve the geospatial data from a remote source via the Internet 31. Alternatively, or in addition, the software product 149 may also include instructions to establish a database 20 which includes all of the calculations conducted in method 100 and data that is generated from those calculations. Alternatively, the calculations and data may be stored in another data storage arrangement that is accessible to computer system 33.

Figure 5:
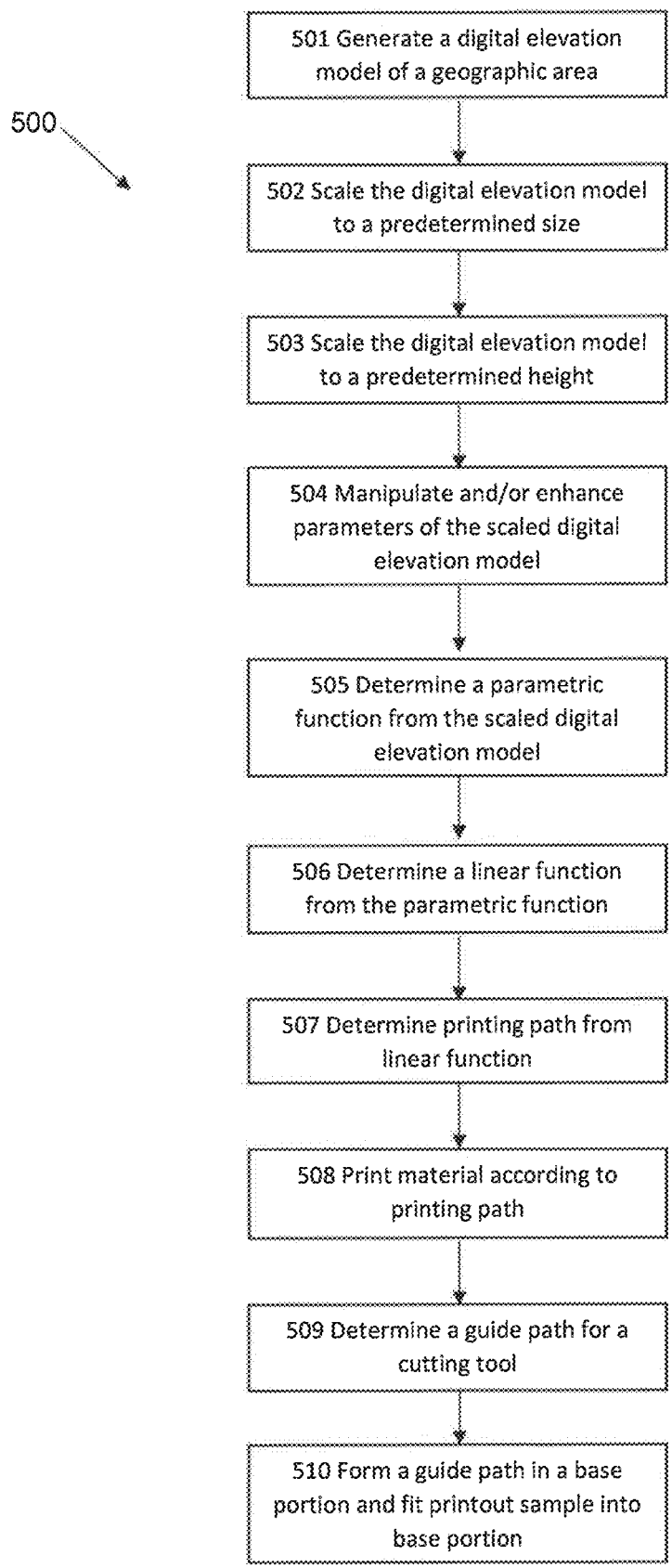
FIG. 5 illustrates a flowchart of steps of a method of forming a physical model of a geographic area in accordance with another embodiment of the invention.

Referring now to FIG. 5, there is illustrated a flowchart of an exemplary method 500 (that may be implemented in computer system 33 described above, for example) of calculating a digital model of a geographical area and forming a physical model from the digital model.

Method 500 is substantially similar to method 100 described above and uses many of the same processes, as will become evident from the following description.

At Step 501, the method includes the step of generating a digital elevation model of the topography of a chosen geographic area (such as a waterscape or landscape, for example). The chosen geographic area may comprise a location that is familiar to a person desiring the physical model or may be a location that they find to be particularly interesting or beautiful.

In generating the digital elevation model, the digital elevation model of the topography of the geographic area is extracted from a geospatial database and includes a height (z) of the topography of the geographic area and geographic coordinates (x, y), where z=F(x, y).

In a next step, Step 502, the method scales the digital elevation model to a predetermined size (L) in the x- and y-planes. The digital elevation model is scaled in the range of [0,L]. The predetermined size may be any value as defined by a customer or designer.

In Step 503, the digital elevation model height (z) is scaled to a predetermined height (H) in the range of [0,H], where H is defined by the predetermined height of the physical model. The predetermined height of the physical model may also be any value as desired.

In Step 504, the x, y and z parameters can be manipulated and/or enhanced for illustrative purposes. For example, in some embodiments, an algorithm $z=F(x, y)^2$ or $z=e^{F(x,y)}$ can be used to accentuate peaks of the topography and/or $z=F(x, y) \times H(x, y)$ can be used to reduce the edge heights of the physical model to 0 smoothly or continuously, rather than discontinuously or suddenly, which may detract from the aesthetic of the physical model.

In Step 505, using an algorithm, a parametric function is determined from the scaled x, y and z parameters of the scaled digital elevation model. The parametric function samples the elevation along the path of a predetermined shape of the physical model. The predetermined shape, as described above, may include a spiral, a series of concentric circles, a plurality of substantially parallel surfaces or some other shape or configuration.

The parametric function of the scaled digital elevation model is parameterised as a function of t and is defined by x=f(t),y=g(t), where x and y are coordinates of the elevation model and t over the range [0,T] covers the area of the physical model.

In Step 506, a linear function is determined or derived from the parametric function calculated in Step 105.

More specifically, the functions are transformed into a linear path consisting of an equally spaced sequence of linear segments that represent the heights along the curve defined by the scaled digital elevation model. The distance for each linear segment between t=u and t=v by:

$$\int_u^v \sqrt{\left(\frac{dx}{dt}\right)^2 + \left(\frac{dy}{dt}\right)^2} \, dt.$$

In Step 507, the elevation at each sample point (determined above) is determined from the linear function to crate a cutting path. In particular, a linear path that represents the heights of the elevation at each sample point along the curve is interpolated to produce a new curve to define a printing path for an additive tool (such as a 3D printer, for example) to form the finished physical model. The material can conceivably be any material that is capable of being additively produced, such as fabric, resins, thermosetting plastics and resins, thermoplastic, wood (preferably thin wood so as to be flexible) leather, plastic, cardboard or rubber, to name a few examples.

In Step 508, the material is then printed, or additively manufactured, according to the printing path using an appropriate additive tool (such as the 3D printer mentioned above) to produce a linear printout sample. The linear printout sample (i.e. the printed material) is then physically manipulated in accordance with the predetermined shape according to the parametric function.

In Step 509, a guide path is determined to ensure alignment of the manipulated material with the parametric function for the predetermined shape. The guide is determined by interpolating the values of the parametric function along x and y coordinates to produce a tool path that can be used with a cutting tool such as CNC router or a laser cutter, for example.

In Step 510, the cutting tool is then programmed with the tool path and physically cuts the guide path into a base portion that the linear printout sample/s is/are inserted into or attached to hold the linear printout sample/s in the appropriate positions to produce the physical model of the geographic area.

The cutting tool forms the guide path in the base portion such that when the linear printout sample/s is/are attached to the base portion, the final physical model will reasonably accurately visually resemble the geographic area that is to be represented. It will be understood if the guide path was formed randomly or without definition with regard to the geographic area, then the final physical model would be unlikely to accurately resemble the geographic area it is intended to represent.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

The invention claimed is:

1. A method of forming a physical model of a geographic area, the method including the steps of:
   generating a digital elevation model of a topography of a defined geographic area;
   scaling the digital elevation model to a predetermined size;
   determining a parametric function from the scaled digital elevation model according to a predetermined shape;
   determining a linear function from the parametric function;
   determining a machine path from the linear function;
   forming one or more material portions according to the machine path, thereby forming one or more portions representative of the defined geographic area when manipulated according to the predetermined shape; and
   interpolating the parametric function along x and y coordinates to produce a guide path configured to receive the one or more portions representative of the defined geographic area.

2. The method of claim 1, wherein the parametric function includes a parametric function sampling elevation based on the predetermined shape.

3. The method of claim 1, wherein determining the linear function from the parametric function includes transforming the parametric function into the linear function.

4. The method of claim 1, wherein determining the machine path from the linear function includes interpolating the linear function to determine a linear path for a machine.

5. The method of claim 1, wherein the machine path comprises a cutting path or a printing path for a manufacturing tool or machine to form one or more portions from a material based on the machine path.

6. The method of claim 1, wherein the machine path comprises a cutting path and the method further includes the step of operating a machine to form the one or more portions representative of the defined geographic area based on the cutting path.

7. The method of claim 6, wherein the machine comprises a cutting tool, wherein the cutting tool receives the cutting path and the cutting tool cuts a material according to the cutting path to form the one or more portions representative of the defined geographic area.

8. The method of claim 1, wherein the machine path comprises a printing path and the method further includes the step of operating a machine to form the one or more portions representative of the defined geographic area based on the printing path.

9. The method of claim 8, wherein the machine comprises an additive manufacturing tool, wherein the additive manufacturing tool receives the printing path and the additive manufacturing tool prints a material according to the printing path to form the one or more portions representative of the defined geographic area.

10. The method of claim 1 further including the step of forming the guide path in a base portion and applying the one or more portions to the base portion adapted to retain the one or more portions in accordance with the predetermined shape to thereby produce a physical model of the geographic area.

11. A system for forming a physical model of a geographic area, the system comprising:
- a computer having one or more electronic processors and a software product installed thereon, the software product being configured to operate the one or more electronic processors of the computer to calculate a digital model of a defined geographic area from geospatial data by:
  - generating a digital elevation model of a topography of the defined geographic area from geospatial data;
  - scaling the digital elevation model to a predetermined size;
  - determining a parametric function from the scaled digital elevation model according to a predetermined shape; and
  - determining a linear function from the parametric function;
  - determining a machine path from the linear function; and
  - interpolating values of the parametric function along x and y coordinates to produce a guide path configured to receive one or more portions representative of the defined geographic area
- a machine configured to receive the machine path from the computer and form one or more lengths of material according to the machine path to form the one or more portions representative of the geographic area when manipulated according to the predetermined shape.

12. The system of claim 11, wherein the computer receives the digital elevation model as an input file that is uploaded to the software product from a database or memory of a computer having the software product installed thereon.

13. The system of claim 11, wherein the parametric function includes a parametric function sampling elevation based on the predetermined shape.

14. The system of claim 11, wherein determining the linear function from the parametric function includes transforming the parametric function into the linear function.

15. The system of claim 11, wherein determining the machine path from the linear function includes interpolating the linear function to determine a linear path for a machine.

16. The system of claim 11, wherein the machine path comprises a cutting path or a printing path for a manufacturing tool or machine to form one or more portions from a material based on the machine path.

17. The system of claim 11, wherein the machine path comprises a cutting path and the machine forms the one or more portions representative of the defined geographic area based on the cutting path.

18. The system of claim 17, wherein the machine comprises a cutting tool, wherein the cutting tool receives the cutting path and the cutting tool cuts a material according to the cutting path to form the one or more portions representative of the defined geographic area.

19. The system of claim 11, wherein the machine path comprises a printing path and the machine forms the one or more portions representative of the defined geographic area based on the printing path.

20. The system of claim 19, wherein the machine comprises an additive manufacturing tool, wherein the additive manufacturing tool receives the printing path and the additive manufacturing tool prints a material according to the printing path to form the one or more portions representative of the defined geographic area.

* * * * *